US007867544B2

(12) United States Patent
Buck et al.

(10) Patent No.: US 7,867,544 B2
(45) Date of Patent: Jan. 11, 2011

(54) FOOD COMPOSITIONS AND RELATED METHODS

(75) Inventors: Allan W. Buck, Decatur, IL (US); Michael G. Kuffel, Brookfield, WI (US)

(73) Assignee: Archer Daniels Midland Company, Decatur, IL (US)

( * ) Notice: Subject to any disclaimer, the term of this patent is extended or adjusted under 35 U.S.C. 154(b) by 771 days.

(21) Appl. No.: 11/179,717

(22) Filed: Jul. 12, 2005

(65) Prior Publication Data

US 2006/0008576 A1 Jan. 12, 2006

Related U.S. Application Data

(60) Provisional application No. 60/587,131, filed on Jul. 12, 2004.

(51) Int. Cl.
*A23G 1/00* (2006.01)
(52) U.S. Cl. ........................... 426/631; 426/548
(58) Field of Classification Search .................. 426/631, 426/548
See application file for complete search history.

(56) References Cited

U.S. PATENT DOCUMENTS

| 3,876,794 | A | * | 4/1975 | Rennhard | ................. | 426/548 |
|---|---|---|---|---|---|---|
| 4,107,347 | A | | 8/1978 | Burley | | |
| 4,664,927 | A | | 5/1987 | Finkel | | |
| 4,810,516 | A | * | 3/1989 | Kong-Chan | ................. | 426/548 |
| 4,980,189 | A | * | 12/1990 | Keme et al. | ................. | 426/548 |
| 5,017,400 | A | * | 5/1991 | Olinger et al. | ................. | 426/660 |
| 5,098,730 | A | * | 3/1992 | Pepper et al. | ................. | 426/548 |
| 5,360,621 | A | * | 11/1994 | Mentink et al. | ................. | 426/548 |
| 5,425,957 | A | * | 6/1995 | Gaim-Marsoner et al. | .... | 426/98 |
| 5,458,892 | A | | 10/1995 | Yatka et al. | | |
| 5,472,732 | A | | 12/1995 | Ohkuma et al. | | |
| 5,490,996 | A | * | 2/1996 | Despland et al. | ................. | 426/548 |
| 5,711,982 | A | | 1/1998 | Takemori et al. | | |
| 5,779,806 | A | * | 7/1998 | Heikkila et al. | ................. | 127/61 |
| 5,962,063 | A | * | 10/1999 | Siukola et al. | ................. | 426/631 |
| 6,045,850 | A | * | 4/2000 | Kondou | ................. | 426/548 |
| 6,261,627 | B1 | * | 7/2001 | Armstrong et al. | ................. | 426/584 |
| 6,296,891 | B1 | * | 10/2001 | Zumbe et al. | ................. | 426/631 |
| 6,423,358 | B1 | * | 7/2002 | Barndt et al. | ................. | 426/548 |
| 6,488,979 | B1 | * | 12/2002 | Davila et al. | ................. | 426/631 |
| 6,706,307 | B2 | * | 3/2004 | Armstrong et al. | ................. | 426/584 |
| 6,773,744 | B1 | * | 8/2004 | Ward et al. | ................. | 426/659 |
| 6,872,415 | B2 | * | 3/2005 | Rapp et al. | ................. | 426/548 |
| 2001/0012536 | A1 | * | 8/2001 | Armstrong et al. | ................. | 426/631 |
| 2004/0086615 | A1 | * | 5/2004 | Johnson et al. | ................. | 426/548 |

FOREIGN PATENT DOCUMENTS

| EP | 0487187 A1 | 5/1992 |
|---|---|---|
| JP | 60/232058 | 11/1985 |
| WO | WO 80/01869 | 9/1980 |

OTHER PUBLICATIONS

Igoe, R. 1989. Dictionary of Food Ingredients. van Nostrand Reinhold, New York. p. 103.*
Saijonmaa, T. 1978, Preparation and characterization of milk sugar alcohol, lactitol. Milchwissenschaft 33(12)733-736.*
A. Zumbe, et al., "*Polyols in confectionery: the route to sugar-free, reduced sugar and reduced calorie confectionery*," British Journal of Nutrition, (2001), 85, Suppl. 1, S31-S45.
S. T. Beckett, "Chapter 2: Chocolate Ingredients" in *The Science of Chocolate*, Thomas Graham House, Cambridge, UK, 2000, pp. 8-30.
International Search Report for International Application No. PCT/US2005/024877, European Patent Office (acting as International Searching Authority), 4 pp. (Oct. 10, 2005).
Written Opinion of the International Searching Authority for International Application No. PCT/US2005/024877, European Patent Office (acting as International Searching Authority), 5 pp. (Oct. 10, 2005).

* cited by examiner

*Primary Examiner*—Carolyn A Paden
(74) *Attorney, Agent, or Firm*—Andrew F. Nilles

(57) ABSTRACT

An amorphous sugar-free sweetening composition acts as a sugar substitute in the production of a chocolate confection. Maltitol syrup may be employed in a chocolate confection mixture with a dry milk substitute composition to form a chocolate confection with improved taste and texture characteristics as compared to other sugar-free chocolate confection compositions. Other amorphous sweetening compositions may be used in the production of chocolate compositions. Methods of making chocolate compositions are also disclosed.

39 Claims, No Drawings

FOOD COMPOSITIONS AND RELATED METHODS

CROSS-REFERENCE TO RELATED APPLICATIONS

This application claims priority to U.S. Provisional Application Ser. No. 60/587,131 filed Jul. 12, 2004, which is incorporated in its entirety by reference herein.

FIELD OF THE INVENTION

Provided herein are methods of making food compositions and the food compositions made therefrom. More particularly, a novel ingredient and an improved method of making a chocolate composition, such as a chocolate crumb confection are disclosed.

BACKGROUND OF THE INVENTION

There are three general types of chocolate: dark (sweet) chocolate (as defined in CFR 21: 163.123), milk chocolate (CFR 21: 163.130) and white chocolate (CFR 21: 163.124), all of which are derived from cacao beans, particularly compositions derived from cacao beans, such as cocoa liquor, cocoa powder, and/or cocoa butter. Traditional dark chocolate may be defined as a product, which is obtained from cocoa liquor consisting of cocoa liquor containing about 54% of cocoa butter, sucrose and additional cocoa buffer. Milk chocolate contains milk in addition to the dry matter. White chocolate also contains milk but lacks cocoa solids.

All of these chocolates may be combined with filling ingredients such as hazel nuts, crisped rice, desiccated fruits or the like. From a physical point of view, a chocolate may be assimilated with a practically anhydrous dispersion of very fine nonfatty particles (sucrose, lactose, proteins, minerals and the like) in a solidified fatty phase of triglycerides. The triglycerides may be solely derived from cocoa liquor in the case of a dark chocolate, but also are derived from milk fat and cocoa butter in the case of milk or white chocolate.

The preparation of chocolate involves four stages: mixing/kneading, refining, conching, and tempering. In the first stage the ingredients are mixed together in a kneading process that also involves refining, or grinding, for example, on a multiple roll refiner to provide a smooth fluid paste. The ingredients may be added sequentially, and in particular the cocoa butter may be added step-wise to control the viscosity of the composition. The sugar may also be pre-ground to a smaller particle size to reduce the length of time required in the kneading and refining of the chocolate mixture. The paste resulting from kneading should have a specific texture that is appropriate for the subsequent refining operation. It is possible to control the texture by the choice of the particle size of the sugar, fat content, and/or addition of emulsifiers.

After kneading and refining, most chocolate is subjected to the process of conching when the chocolate mixture is mechanically worked to give the chocolate a fuller and more homogeneous flavor and improved rheological characteristics. This is typically done at increased temperatures, ranging from 75° C. to 80° C. for dark chocolate, and about 65° C. for white and milk chocolates. Other ingredients such as flavors, for example, vanilla, and extra cocoa butter may be added at this stage if desired. A frequently added additional ingredient is lecithin or other emulsifiers, which improve the flow properties of the chocolate and thereby enables the amount of cocoa butter to be reduced.

The third stage of the chocolate preparation is called tempering, in which the liquid chocolate composition is cooled to a temperature below its solidification temperature and then reheated in order to form the proper fat crystal structure to facilitate the rapid crystallization of its fat content on cooling. The final appearance of the chocolate, its texture and keeping properties depend upon correct tempering stage conditions. After tempering, and in the fourth stage of molding, the chocolate may finally be cast into molds to set or may be used in an enrobing process to produce chocolate-coated confectionery, etc.

In another production technique known as the crumb technique, liquid milk or concentrated milk products are mixed with sugar and a chocolate composition, and subsequently heated to boiling point under vacuum. This mixture is worked with or without cocoa liquor before drying under high vacuum in order to obtain a powder containing less than 1% water. This process makes it possible to obtain a milk chocolate having organoleptic properties, which are very different from those obtained with the conventional method. The product obtained from the crumb technique may be further refined by milling to a product with a homogeneous particle size. The product may also undergo many of the physical treatment processes common with other non-crumb chocolates.

With each manufacturing technique, and at all stages of each technique, it is important to control the viscosity of the chocolate composition in order to achieve desired texture characteristics of the finished product and ensure proper workability of the composition. Viscosity is controlled by the amount of liquid added; as for example, in the form of cocoa butter and/or milk in the composition; and it is important to control its addition in order to maintain proper viscosity ranges and ensure proper quality of the final composition.

Chocolate confectionary products have traditionally derived their sweetness from sucrose (table sugar). Its organoleptic and technological properties render it particularly suitable for this type of confectionery product. Sucrose is a disaccharide comprised of a glucose and fructose moieties, and is present in processed foods in significant amounts. Sucrose may be harmful to humans when consumed in large quantities, affecting dental health by contributing to cavities in teeth (cariogenic), as well as contributing to obesity and diabetic conditions. Because of its abundance in processed foods, many consumers monitor their sucrose intake, and there is also accordingly a high consumer demand for sugar-free foods.

Other sweeteners have therefore been proposed and some have been used to provide dietary type chocolate for diabetics and slimmers. One class of replacement sweetener for sucrose in chocolate is the so-called sugar alcohols, or polyols, in particular sorbitol, maltitol and mixtures of sugar alcohols typically known as hydrogenated starch hydrolysates. Sugar alcohol sweeteners, besides contributing fewer calories to the chocolate than the equivalent quantity of sucrose are also far less cariogenic. Polyols are also slowly metabolized and they do not cause a sharp rise in the level of blood glucose following their consumption. Consequently, they are often recommended in the diet for diabetics. Furthermore, their calorific value is estimated at a mean value of 2.4 kcal/g (10.0 KJ/g), that is to say about 60% of that for sugar.

However, there are technological manufacturing imperatives, including in particular, the rheological properties, which are necessary in order to perform the refining, conching and molding operations under satisfactory conditions, which prevent widespread use of effective compositions containing polyols as a substitute for sucrose in chocolate.

This is true particularly for refining, which is a stage in which the paste must be sufficiently cohesive in order to be properly suitable for grinding in the rollers of the refining device. A paste, which is too dry, would render the rolling impossible. Polyols, by virtue of their hygroscopicity, tend to increase this viscosity of the paste. It should be noted that the addition of an emulsifier such as lecithin prior to conching with the intent to reduce the viscosity of the chocolate paste, can compensate only to a certain degree. Indeed, excess lecithin in a chocolate mix typically leads to the formation of an undesirable stable water-in-oil emulsion. A too stable emulsion prevents the evaporation of water and volatile compounds which is sought during conching. Worse still, formation of a too stable emulsion also may lead to an effect which is the reverse of that sought, namely an increase in the yield point of the chocolate paste.

Moreover, some polyols are highly hygroscopic which poses storage problems during the manufacturing process. Thus, when polyols are included in a chocolate recipe, manufacturers typically use conditioned atmospheres with controlled humidity levels in order to avoid water being taken up. This phenomenon is observed for sorbitol in particular.

Still with respect to these hygroscopicity problems, the brittleness and the morphology of the crystalline powders of some polyols, such as sorbitol and hydrogenated isomaltulose, cause, during refining, the formation of particles having a specific surface area which is greater than that of sugar. This renders the worked paste more hygroscopic and therefore more viscous, and requires the use of a higher amount of fatty substances in order to improve the Theological behavior of this paste. Moreover, the temperature increases which occur directly or indirectly during the grinding, kneading, refining, or conching operations render the polyols more unstable for a number of reasons.

Firstly, the hygroscopicity of the polyols increases. In the specific case of sorbitol, the critical relative humidity, the relative humidity which should not be exceeded in the manufacturing environment, thereby drops from 73% to 62% when the temperature is increased from 20° C. to 40° C. Secondly, the temperature increases may result in a disorganization of the crystalline states, by releasing the water of crystallization when the relative humidity is low in the case of polyols of hydrated crystalline form (hydrogenated isomaltulose, lactitol monohydrate and the like), or by melting of the crystals in the case of polyols having a low melting point (xylitol, sorbitol and the like). This melting or disorganization of the polyol crystals results in a transition to a very hygroscopic amorphous state in the later stages of the preparation of the chocolate composition. It should be noted that melting of the polyol (which may occur) occurs at a later stage in the manufacturing process and is an undesirable side-effect as the chocolate compositions are largely unworkable as a result of the increased viscosity.

European Patent Application No. 0317917, for its part, relates to a process for manufacturing sugar-free and noncariogenic milk chocolate using the so-called "crumb" technique. The sugar substitutes used in this process are maltitol, lactitol or hydrogenated isomaltulose (equimolar mixture of 1,6-glucopyranosylmannitol and 1,6-glucopyranosylsorbitol, which is marketed under the registered trade mark ISOMALT). The chocolates manufactured according to this process have a fat content which is not less than 35% by weight.

U.S. Pat. No. 5,962,063 to Siukola, et al. discloses a process for preparation of chocolate crumb using sugar alcohols. The process focuses on adding the polyols in a crystalline state in portioned amounts, controlling the temperature during the process so that not all of the bulk sweetener (polyol) was dissolved. It was found in Siukola that if all of the sweetener was dissolved and/or melted during the procedure, the chocolate manufacturing method was ineffectual.

Japanese Patent Application No. 60/232058 describes a chocolate in which sugar is replaced with a mixture of maltitol powder and lactose or maltose or mannitol or a mixture of these. The fat content of some of the chocolates, whose preparation is described in the examples and in the control tests, is of the order of 26.5% by weight, but it is explicitly indicated in that patent application that the chocolate, whose sweetening mass consists solely of maltitol (control 2), is of poor quality, namely that it is granular, that it has a sweet taste which is unsatisfactory and that it has a sandy feel on the tongue. Furthermore, it is also stressed that its production process is very difficult to implement. The polyol used to prepare the chocolate product consists of a maltitol syrup powder. The described maltitol-containing chocolate is used, moreover, as negative control which is intended to demonstrate the advantages of the invention which is claimed in that application and which, precisely, provides for the use of the mixture of maltitol and at least one other sugar such as maltose, lactose or mannitol, in order to overcome the disadvantages of a low-fat chocolate whose sweetening mass would consist solely of a polyol such as maltitol. The reading of that document could only have convinced a person of ordinary skill in the art not to use maltitol as sweetening mass for preparing a low-fat polyol-containing chocolate.

U.S. Pat. No. 5,360,621 to Mentink et al. also discloses using maltitol as a sugar substitute in a chocolate composition. The disclosure of Mentink provides for using a maltitol composition of extremely high purity with a total fat content of less than 32% by weight in order to provide for a chocolate composition with suitable viscosity and flowable characteristics.

While there are drawbacks to using polyols in crystalline structure in a chocolate composition, the use of a polyol in a fluid state has also been thought to have numerous adverse affects on the rheological properties of the chocolate preventing its implementation. Primarily, a chocolate composition comprising a polyol in a fluid state would increase its viscosity to an unworkable state, which adversely affects the texture and taste of the finished product. Furthermore, a chocolate composition with a high moisture content resulting from using a liquid polyol would have increased susceptibility to microgrowth of bacteria and other undesirable organisms.

While the dissolution and/or melting of the sweetener in a chocolate composition is often unavoidable, it has been contemplated to prevent its occurrence in most instances in the art; see, for example, U.S. Pat. No. 5,962,063 to Siukola. It is desirable therefore to provide a sugar-free sugar substitute which may be introduced into a chocolate composition in an amorphous state and a chocolate mixture suitable to accommodate use of the amorphous sweetening additive.

Liquid polyols have however, been used in chocolate compositions, but not as a replacement for sugar. U.S. Pat. No. 4,664,927 to Finkel, for example, discloses the addition of a liquid polyol to a chocolate composition in order to adjust the Theological properties of the chocolate. The liquid polyol is added in addition to sucrose or sweetener already present in the chocolate composition and is added only after tempering of the chocolate composition in order to create a chocolate composition which is substantially non-flowable at temperatures above its normal melting point.

U.S. Pat. No. 6,488,979 to Davila et al. also discloses the addition of liquid polyols such as glycerine, sorbitol, and mannitol in order to create a chocolate composition which is resistant to melting. Similarly, the '979 Davila patent discloses that the liquid polyol should be added in addition to sucrose or the sweetening agent of the chocolate composition. Neither the '927 Finkel reference or the '979 Davila reference disclose the use of a liquid sweetening agent but rather use a liquid polyol in order to adjust the viscosity and create a chocolate composition with increased resistance to melting after its manufacture.

In each case, the attempt to use a polyol as a sweetener or replacement for sugar has focused on attempts to use it in its crystalline state as flowable liquid polyols are believed to not be suitable for use in chocolate compositions as the sweetening agent. However, many of the problems associated with using polyols as a substitute for sucrose have not been overcome. There is a need therefore to develop a method of making a chocolate confection or composition, for example a sugar-free chocolate confection, using an amorphous sweetening composition. It is further desirable to provide a method of making chocolate that effectively uses an amorphous polyol as the sweetener composition. It is further desirable to develop a method of making a sugar-free chocolate confection without the deleterious side-effects of using a polyol as a substitute for sucrose.

SUMMARY OF THE INVENTION

Provided therefore is a method of making a sugar-free chocolate confection comprising mixing an amorphous sugar-free sweetening composition acting as a sugar substitute with a dry milk substitute composition and a chocolate formative composition to form a rudimentary chocolate mixture. The mixture is then heated and subsequently vacuum dried to form a chocolate confection, preferably a chocolate crumb. Preferably, the amorphous sugar-free sweetening composition is selected from the group consisting of a polyol and an indigestible dextrin. More preferably, the amorphous sweetening composition is a polyol selected from the group consisting of maltitol syrup, sorbitol syrup, mannitol syrup, lactitol syrup, isomalt syrup, erythritol syrup, xylitol syrup, hydrogenated starch hydrolysates, and combinations thereof, and most preferably, the amorphous sweetening composition is maltitol syrup.

Preferably the amorphous sugar-free sweetening composition is present in the composition from about 55% to about 95% by weight (wt.) of the confection, the dry milk substitute composition is present from about 5% to about 15% by wt. of the confection and, the chocolate formative composition is present from about 10% to about 50% by wt. of the confection. The dry milk substitute composition may be selected from the group consisting of dried sodium caseinate, dried calcium caseinate, and whey protein isolates. The chocolate formative composition may be selected from the group consisting of cocoa liquor, chocolate liquor, cocoa butter, and cocoa powder, and in a particularly preferred embodiment is cocoa liquor.

Also provided herein is a sugar-free sweetening additive in a chocolate confection composition, the additive comprised of an amorphous maltitol composition.

Also provided herein is a rudimentary chocolate mixture from which a sugar-free chocolate confection is formed, the mixture including an amorphous sugar-free sweetening composition acting as a sugar substitute, a dry milk substitute composition, and a chocolate formative composition.

Further provided herein is a method of making a chocolate composition, such as a chocolate crumb confection and the chocolate compositions and crumb confections made therefrom. The method includes mixing an amorphous sweetening composition with a dry milk substitute composition and a chocolate formative composition to form a rudimentary chocolate mixture. The mixture may be then heated and stirred and vacuum dried. The amorphous sweetening composition may be selected from the group consisting of corn syrup, high fructose corn syrup, honey, molasses, polyols, tagatose syrup, and indigestible dextrins. It has been surprisingly found that by using a dry milk substitute composition with an amorphous sweetening composition, many of the adverse manufacturing disadvantages of using a liquid sweetening composition may be avoided.

Still further provided herein is a chocolate composition comprising: an amorphous sweetening composition, a dry milk substitute, and a chocolate formative composition. The amorphous sweetening composition, the dry milk substitute and the chocolate formative composition are mixed together, heated and vacuum dried to yield the chocolate composition.

In another non-limiting embodiment, the present disclosure provides for a milk crumb confection composition comprising: an amorphous sweetening composition: a dry milk substitute composition: and at least one of an oil and a fat. The amorphous sweetening composition, the dry milk substitute and the at least one of an oil and a fat are mixed together, heated and vacuum dried to yield the milk crumb composition.

DETAILED DESCRIPTION OF THE INVENTION

Provided herein is a sugar-free amorphous sweetening composition, a sugar-free chocolate confection prepared therefrom, and method of making the same, along with a chocolate composition and method for making the same. In a preferred embodiment maltitol syrup is the amorphous sugar-free sweetening composition, and the chocolate confection made therefrom may be a chocolate crumb composition. As used herein, the term "amorphous" refers to a composition of matter which lacks crystalline structure, has no known definite configuration, and exhibits a readiness to flow at room temperature. The amorphous sweetening composition is in a liquid state and is more flowable than crystalline sugar structures in a solid state or a solution. Preferably the amorphous sweetening composition has a viscosity in the range of 500 to 20,000 centipose.

The term "sugar" as used herein refers to sucrose or table sugar. The term "sugar-free" as used herein refers to foodstuffs and/or ingredients within foodstuffs which are substantially free of sucrose. A "sugar substitute" as used herein is a composition which is sugar-free, i.e., substantially free of sucrose, and acts as a sweetening agent in a sugar-free foodstuff.

A "chocolate formative composition" as used herein refers to a pre-chocolate composition derived from cacao beans typically used in making chocolate. In the process of manufacturing chocolate, the cacao seeds are typically crushed, and heated to melt the cocoa butter therein and subsequently ground to a thick paste, known as cocoa liquor or chocolate liquor. In certain non-limiting embodiments, the chocolate formative composition may comprise a triglyceride product, such as, for example, a vegetable fat, animal fat, animal oils, vegetable oil or other plant oil; and cocoa solids, such as, for example, cocoa powder. For example, the chocolate formative composition also may be a cocoa powder with a vegetable fat, vegetable oil, or cocoa butter in combination with a dried milk composition and amorphous sweetener.

The term "dried milk composition" as used herein refers to a non-liquid milk derived substance suitable for use in a chocolate composition. In a preferred embodiment casein proteins from milk may be dried and combined with a metal such as sodium or calcium to form sodium caseinate or calcium caseinate, compositions particularly suitable for use with an amorphous sweetening composition.

Indigestible dextrins such as are commercially available under the trade names Fibersol® and Fibersol-2® (registered trademarks of Matsutani Chemical Industry Co., Ltd., Japan) also may be used as the amorphous sugar-free sweetening composition in a method provided herein. Fibersole® and Fibersol-2® are trade names given to indigestible dextrins which are very water soluble but have digestion properties similar to fiber. In one non-limiting process for making indigestible dextrins, such as Fibersol-2®, starches are hydrolyzed by acid or enzymes to shorter chain carbohydrates comprised of glucose units. While completely hydrolyzed starch will yield glucose, intermediate products include such dextrins as Fibersol-2®. All starches are composed of mostly $\alpha$-1,4 linkages between the glucose units with relatively few $\alpha$-1,2; $\alpha$-1,3; and $\alpha$-1,6 bonds. As starches are hydrolyzed to maltodextrins and glucose syrups, these products continue to have glucose units linked by $\alpha$-1,4 bonds. Dextrins are made by hydrolyzing starches in a dry state by the addition of acid and heat. This process causes glucose obtained by hydrolysis to recombine with the larger carbohydrates to form $\alpha$-1,2, $\alpha$-1,3, and $\alpha$-1,6 bonds. Adding additional heat and/or acid gives highly branched carbohydrates, or pyrrodextrins and further treatment gives dextrins such as Fibersol®. U.S. Pat. No. 5,458,892, for example, provides a non-limiting example of indigestible dextrins.

Other products that may be used in certain non-limiting embodiments of the compositions and methods herein, in lieu of or in addition to indigestible dextrins include compounds, such as, but are not limited to, polydextrose, inulin oligosaccharides, fructo-oligosaccharides, hydrolyzed guar gum, gum Arabic, arabinogalactan, and other soluble and insoluble fibers.

It has been surprisingly found that an amorphous sugar-free sweetening composition may be used in a chocolate confection. As used herein, the term "amorphous" refers to a composition of matter which lacks crystalline structure, has no known definite configuration, and exhibits a readiness to flow at room temperature. Sugar-free sweetening additives have in the prior art been added to chocolate compositions in a solid state, typically in a crystalline structure. It was not thought that an amorphous, or liquid sugar-free sweetener could be added to a chocolate composition because moisture and/or water in a chocolate confection significantly increases the viscosity and promotes microgrowth of bacteria in the composition. The inventors have found however, that if another additive or ingredient is employed in a solid state, such as a dried milk substitute composition, is substituted for the typically liquid milk composition, many of the problems associated with the increased viscosity and hygroscopicity of a liquid sweetener in a chocolate composition may be solved. It would therefore be feasible and advantageous to use an amorphous sugar-free sweetening composition. This is further advantageous because maltitol exists in limited supply in crystalline form, and the use of maltitol syrup may have advantageous economic impact on the production of sugar-free chocolate as maltitol syrup is readily available.

It is further contemplated that other amorphous sweetening compositions may be utilized in certain embodiments of the present disclosure. In certain embodiments, amorphous sweetening compositions, such as, but not limited, to corn syrup, for example high fructose corn syrup; molasses; honey; polyols; indigestible dextrin; tagatose syrup; and combinations thereof may be incorporated into the methods and compositions disclosed herein. In addition, these amorphous sweetening compositions may be blended with the amorphous sweetening compositions disclosed herein, such as, for example, maltitol syrup, sorbitol syrup, mannitol syrup, lactitol syrup, isomalt syrup, erythritol syrup, xylitol syrup, hydrogenated starch hydrolysates, and combinations thereof, and the blended combination used in the chocolate compositions disclosed herein. As disclosed above, examples of indigestible dextrin and other suitable compounds include Fibersol, Fibersol-2, polydextrose, inulin oligosaccharides, fructo-oligosaccharides, hydrolyzed guar gum, gum Arabic, arabinogalactan, and other soluble and insoluble fibers.

It has also been discovered that chocolate confection compositions made by the methods disclosed herein have improved taste characteristics. The chocolate flavor is more concentrated than sugar-free chocolate compositions made by prior techniques. Further, the chocolate compositions are also richer in color, for example, the dark chocolates are darker than dark chocolates made by prior techniques.

The sugar-free chocolate confections provided herein also have advantageous organoleptic characteristics as compared to other sugar-free chocolate confection compositions. For example, sugar-free chocolate compositions, especially those containing polyol sweeteners typically have a cooling effect in the mouth. Such a cooling effect is an undesirable characteristic of sugar-free chocolates as it leaves consumers with an impression that the sugar-free chocolate composition is not as rich and flavorful as a traditional chocolate confection composition. The chocolate confection produced by the methods provided herein however provides a sugar-free chocolate composition with decreased cooling effect as compared to other sugar-free confection compositions.

Preferably, a maltitol syrup is used as the amorphous sugar-free sweetening composition of the present method. Other polyol syrups are also contemplated within the present method, including, but not limited to, sorbitol syrup, mannitol syrup, lactitol syrup, isomalt syrup, erythritol syrup, xylitol syrup, and hydrogenated starch hydrolysates. The term polyol as used herein refers to a polyhydric alcohol with three or more hydroxyl groups, and anywhere from 3 to about 36 carbon atoms. Polyols, or sugar alcohols, have the general formula $CH_2OH(CHOH)_nCH_2OH$ where n may be from 2 to 5. It is contemplated, however, that the polyols of the present invention include two or more of these units, thus comprising an oligomeric or polymeric chain of the single units. Maltitol is an example of a bis-polyol unit (i.e., a compound containing two polyol monomer units) contemplated within the present embodiment, and is represented by the formula $C_{12}H_{24}O_{11}$, comprising two six-carbon units attached by an ether bond.

A sugar-free chocolate confection made by the method included herein has been found to have significant advantages as compared to other sugar-free chocolates, including a more intense chocolate flavor, richer color, and beneficial organoleptic characteristics of the sugar-free chocolate confection. The sugar-free chocolate confection may be prepared from the process comprising mixing an amorphous sugar-free sweetening composition with a dry milk substitute composition and a chocolate formative composition to form a rudimentary chocolate mixture. The mixture may be heated and subsequently vacuum dried to produce the sugar-free chocolate confection.

As a result of being a sugar-free confection, the chocolate compositions described herein further are low in carbohydrate content as compared to chocolate confections with sucrose. In one embodiment, the amorphous sweetening composition comprises from about 55% to about 95% by wt. of the composition, the dry milk substitute composition comprises from about 5% to about 15% by wt. of the composition, and the chocolate formative composition comprises from about 10% to about 50% by wt. of the composition. In another preferred embodiment, the amorphous sweetening composition comprises from about 65% to about 85% by wt. of the chocolate composition, the dry milk substitute composition comprises from about 7.5% to about 12.5% by wt. of the composition and the chocolate formative composition comprises from about 20% to about 40% be wt. of the composition. In another preferred embodiment, the amorphous sweetening composition comprises from about 70% to about 80% by wt. of the chocolate composition, the dry milk substitute composition comprises from about 9% to about 11% by wt. of the composition, and the chocolate formative composition comprises from about 25% to about 35% by wt. of the composition.

The chocolate formative composition may be chosen from the group consisting of but not limited to cocoa liquor, chocolate liquor, cocoa powder, cocoa powder mixed with vegetable oil, and cocoa butter. While many different embodiments of the present invention are contemplated herein, it is noteworthy that because the sugar-free sweetening composition is an amorphous non-solid composition, one of either the milk composition or chocolate formative composition should be in a solid state. This ensures that the chocolate composition is of suitable viscosity for the physical working of the composition required for chocolates and that the chocolate confection will have the desired texture characteristics.

It should also be noted that the compositions and methods disclosed herein also contemplate a composition where the chocolate formative composition is replaced with an oil composition, which may include other flavoring ingredients. For example, in one non-limiting embodiment, the compositions and methods may comprise a milk crumb comprising: an amorphous sweetener, a dry milk substitute composition; and an oil or fat such as a vegetable oil or fat; animal oil or fat; or plant oil or fat. The composition may be made by any of the methods described herein to yield a milk crumb composition.

According to certain non-limiting embodiments, as discussed above, the method of making chocolate compositions disclosed herein may also utilize other amorphous sweetening compositions. For example, other amorphous sweetening compositions suitable for use according to these methods include, but are not limited to, corn syrup, high fructose corn syrup, molasses, honey, polyols, indigestible dextrine, tagatose syrup, and mixtures or combinations thereof. The present disclosure includes a method of making a chocolate crumb confection. The method comprises: mixing an amorphous sweetening composition with a dry milk substitute composition and a chocolate formative composition to form a rudimentary chocolate mixture; heating the rudimentary chocolate mixture; and vacuum drying the chocolate mixture. According to certain embodiments, the mixture is heated to as temperature sufficient to ensure a homogeneous mixture, for example a temperature of about 50° C. to about 100° C. According to other embodiments, the method may further comprise refining the rudimentary chocolate mixture before heating the mixture. The method may further comprise conching the rudimentary chocolate mixture while heating the mixture. During the conching step, texturizing ingredients, such as lecithin and/or flavor ingredients, such as vanilla, vanillin, coffee, hydrolyzed milkfat, salt, additional cocoa butter and/or other natural flavors, may be added to the rudimentary chocolate mixture. Alternatively, flavor ingredients may be added to the rudimentary chocolate ingredient during the heating step, particularly in methods that do not include conching the chocolate mixture.

According to the various methods comprising an amorphous sweetening composition, the dry milk substitute composition may comprise one or more of dried sodium caseinate, dried calcium caseinate and whey protein isolates. The chocolate formative composition comprises one or more of chocolate liquor, cocoa liquor, cocoa powder, cocoa powder mixed with vegetable oil, and cocoa buffer.

When utilizing an amorphous sweetening composition in the certain methods disclosed herein, the amorphous sweetening composition comprises from about 55% to about 95% by weight of the chocolate composition, such as, for example, a chocolate crumb confection; the dry milk substitute composition comprises from about 5% to about 15% by weight of the composition; and the chocolate formative composition comprises from about 10% to about 50% by weight of the composition. In another embodiment, the amorphous sweetening composition comprises from about 65% to about 85% by weight of the chocolate composition, such as, for example, a chocolate crumb confection; the dry milk substitute composition comprises from about 7.5% to about 12.5% by weight of the composition; and the chocolate formative composition comprises from about 20% to about 40% by weight of the composition. In another embodiment, the amorphous sweetening composition comprises from about 70% to about 80% by weight of the chocolate crumb composition, such as, for example, a chocolate crumb confection; the dry milk substitute composition comprises from about 9% to about 11% by weight of the composition; and the chocolate formative composition comprises from about 25% to about 35% by weight of the composition.

The method for producing a chocolate composition, such as, for example, a chocolate crumb, may additionally comprise incorporating the confection as an ingredient in an edible chocolate or chocolate flavored food product. Examples of suitable food products include, but are not limited to chocolate beverages or beverage mixes, cakes, cookies, chocolate baking mixes, for example chocolate cake mixes, cookie mixes, and chocolate or fudge brownie mixes, chocolate coating mixtures, frostings, ice cream, ice cream toppings and inclusions, dessert toppings and inclusions, frozen desserts, yogurts, milk shakes, confections (such as, for example, caramels, hard candy, chewing gum, chews, jelly beans, and compressed tablets), breakfast cereals, cream fillings, icings, spreads, syrups, breakfast bars, nutrition bars, and chocolate bars.

The present disclosure also contemplates a chocolate composition comprising an amorphous sweetening composition; a dry milk substitute; and a chocolate formative composition, wherein the amorphous sweetening composition, the dry milk substitute and the chocolate formative composition are mixed together, heated and vacuum dried. The amorphous sweetening composition may be any amorphous sweetening composition as defined herein, such as, corn syrup, high fructose corn syrup, molasses, honey, polyols, indigestible dextrin, tagatose syrup, and mixtures thereof. The dry milk substitute may be dried sodium caseinate, dried calcium caseinate or whey protein isolates. The chocolate formative compositions may be cocoa liquor, chocolate liquor, cocoa powder, cocoa powder mixed with vegetable oil, and cocoa butter. According to certain non-limiting embodiments, the chocolate composition comprises a chocolate confection. According to another non-limiting embodiment, the chocolate composition comprises a chocolate crumb composition. The chocolate crumb composition may be an ingredient in a variety of chocolate or chocolate flavored consumable products, such as chocolate beverages or beverage mixes, cakes, cookies, chocolate baking mixes, for example chocolate cake mixes, cookie mixes, and chocolate or fudge brownie mixes, chocolate coating mixtures, frostings, ice cream, ice cream toppings and inclusions, dessert toppings and inclusions, frozen desserts, yogurts, milk shakes, confections (such as, for example, caramels, hard candy, chewing gum, chews, jelly beans, and compressed tablets), breakfast cereals, cream fillings, icings, spreads, syrups, breakfast bars, nutrition bars, and chocolate bars.

The chocolate composition, according to various non-limiting embodiments comprises the amorphous sweetening composition comprises from about 55% to about 95% by weight of the chocolate composition, the dry milk substitute composition comprises from about 5% to about 15% by weight of the composition, and the chocolate formative composition comprises from about 10% to about 50% by weight of the composition. In another embodiment, the amorphous sweetening composition comprises from about 65% to about 85% by weight of the chocolate composition, the dry milk substitute composition comprises from about 7.5% to about 12.5% by weight of the composition, and the chocolate formative composition comprises from about 20% to about 40% by weight of the composition. In another embodiment, the amorphous sweetening composition comprises from about 70% to about 80% by weight of the chocolate composition, the dry milk substitute composition comprises from about 9% to about 11% by weight of the composition, and the chocolate formative composition comprises from about 25% to about 35% by weight of the composition.

It is also preferable that the methods described herein are used to make a chocolate crumb composition. Typically, a chocolate crumb composition is a chocolate composition existing in a solid flaky state and is used to provide chocolate flavor in the production of other compositions, such as milk chocolate coatings, chocolate bars, chocolate cake mix, and other compositions and products requiring chocolate flavor as described herein. The use of an amorphous sweetening ingredient maximizes the intermixing of flavors during the drying process. The amorphous sweetening ingredient further provides for increased retention of the chocolate/milk flavored components and it increases the flavor impact.

The crumb manufacturing technique is a chocolate manufacturing process which produces a solid prefabricated chocolate composition by mixing a sweetening additive, a milk additive, a chocolate formative composition, and heating the composite mixture simultaneously with stirring and subsequently removing the water contained in the mass, for example by heat and/or vacuum, for example, using an oven, a vacuum oven, or a vacuum mixer. The product so obtained, the particle size of which varies within a broad range, may be refined by milling to produce a particle with a homogeneous size range. The mixture is preferably heated and develops a pleasant taste and aroma as a result of a non-enzymatic browning and caramelization reaction known as a Maillard reaction. Such a Maillard reaction, however, does not take place with sugar substitutes such as polyols because polyols lack the carbonyl group required for such a reaction. It has been surprisingly found, however, that the use of an amorphous sweetening composition introduced to the composition in an amorphous state will have advantageous taste characteristics similar to chocolate compositions with sucrose, in part because it is introduced into the composition at an early stage in a liquid state, and thus absorbs and provides for the mixing of flavors more efficiently than if introduced in a solid state.

According to certain non-limiting embodiments of the methods of forming the chocolate compositions of the present disclosure, when combining the amorphous sweetening composition, the dry milk substitute and the chocolate formative composition, the mixture is heated to a temperature sufficient to provide a homogeneous mass. In certain non-limiting embodiments, the mixture is heated to a temperature of about 45° C. to about 125° C. According to other non-limiting embodiments, the mixture is heated to a temperature of about 50° C. to about 100° C. According to other non-limiting embodiments, the mixture is heated to a temperature of about 60° C. to about 80° C. The mixture is heated at the temperatures for a time sufficient to provide a homogeneous mass, for example, in certain non-limiting embodiments the mixture may be heated for up to 1 hour.

It is further contemplated that the amorphous sweetening composition may be used with other methods of chocolate production in addition to the chocolate crumb technique. Such further techniques include kneading, refining, conching, and the addition of further flavor ingredients to the chocolate composition.

Kneading and refining refer to the mixing and grinding, for example, on a multiple roll press of a mixture to provide a smooth fluid paste. During this production stage, the ingredients may be added sequentially, with the liquid composition being added stepwise to control the viscosity of the composition. The paste resulting from kneading should have a specific texture which is appropriate for the subsequent refining operation. After kneading and refining, most chocolate is subjected to the process of conching when the chocolate mixture is mechanically worked to give the chocolate a fuller and more homogeneous flavor and improved rheological characteristics. This is typically done at increased temperatures, ranging from 75° C. to 80° C. for dark chocolates, and at about 65° C. for white and milk chocolates. Other ingredients such as flavors, for example, vanilla, extra cocoa butter, vanillin, coffee, hydrolyzed milkfat, salt, and other natural and artificial flavors may be added at this stage if desired. At any or at all stages, texturizing ingredients may also be added to the chocolate confection composition which improved the rheological properties of the composition and/or adjust the finished texture of the chocolate confection composition. An example of such an additive is lecithin, which is a fat-like phospholipid composition.

In a preferred embodiment provided herein the production of chocolate known as the crumb technique is employed. In the crumb technique utilized with certain embodiments herein, the dry milk substitute composition is mixed with the amorphous sweetening agent, and subsequently heated to a temperature from about 45° C. to about 125° C. under vacuum conditions. In certain non-limiting embodiments, the mixture is heated to a temperature of from about 50° C. to about 100° C. In certain non-limiting embodiments, the mixture is heated to a temperature of from about 60° C. to about 80° C. The mixture is then worked with a chocolate formative composition such as cocoa paste before drying under high vacuum in order to obtain a powder containing from about 0% to about 5% of water. In certain non-limiting embodiments, the composition is dried to a moisture content of from about 0% to about 1% of water. The organoleptic properties of the chocolate composition obtained from the crumb technique are typically different from those techniques requiring further processing steps such as conching. The product obtained from the crumb technique may be further refined by milling to a product with a homogeneous particle size. The product may also undergo many of the physical treatment processes common with other non-crumb chocolates.

EXAMPLES

The following examples illustrate various non-limiting embodiments of the methods and compositions within the present disclosure. These examples are not meant to limit the scope of the invention, as otherwise described or defined by the claims herein.

Example 1

Maltitol syrup was obtained from Roquette America Inc, Keokuk, Iowa (Lycasin®, 25% moisture). The syrup (747.5 grams) was heated in a Stephan mixer to 75° C. (167° F.). After reaching temperature, dried sodium caseinate (75 g) was mixed into the maltitol syrup to form a white slurry. Cocoa liquor (177.5 g) was melted into the slurry and mixing was continued for 30 minutes at 75° C. (167° F.). The resulting mass resembled hot chocolate caramel with some grittiness in the texture.

The mass was placed in a vacuum oven at 75° C. (167° F.). Care was taken to apply gradients of vacuum and temperature to the mass. A vacuum of 20 inches of mercury (in. Hg) was applied and the mass was dried at 75° C. (167° F.) for four hours. Following this, the temperature of the oven was reduced to 45° C. (113° F.) and the mass was dried at this temperature for eleven hours. Subsequently, the temperature was increased to 75° C. (167° F.) and the vacuum increased to 29 in. Hg, and the mass was dried under these conditions for 24 hours.

The resulting chocolate material had a pleasant dark chocolate flavor and a texture of a caramel with inclusions. After drying, the chocolate material was ground in a FitzMill® (available from The Fitzpatrick Co., Elmhurst, Ill.) with the "knife" setting at 9120 RPM, onto which a screen of 0.065 inches was fitted, to produce a chocolate crumb. The residual moisture content of the resulting chocolate crumb was determined in a drying oven at 105° C. The chocolate crumb had a moisture content of 1.07%. After drying, the final composition of the chocolate crumb product was about 68% maltitol, about 9% sodium caseinate, and about 21% cocoa liquor. All composition percentages are presented as weight percentages.

Example 2

Maltitol syrup, dried sodium caseinate, and cocoa liquor were mixed and heated in a Stephan mixer, as shown in Example 1, to yield a chocolate mass. The mass was dried in a vacuum oven at 75° C. (167° F.) under a vacuum of 5 in. Hg for 20 minutes. The vacuum was increased to 21 in. Hg and the drying of the mass continued until the moisture content of the chocolate material was decreased to 2.42%.

The resulting chocolate material had a pleasant dark chocolate flavor and the texture of a caramel with inclusions. After vacuum drying, the chocolate material was ground in a FitzMill® with a "knife" setting at 9120 RPM, onto which a screen of 0.065 inches was fitted, to produce a chocolate crumb. A screen test on 100 g of the milled chocolate crumb yielded 53.9 g of particles retained on a +60 mesh screen; 23.0 g of particles retained on a +80 mesh screen; 16.1 g of particles retained on a +100 mesh screen; and the remainder of the material passing through the +100 mesh screen. After drying, the final composition of the chocolate crumb product was about 68% maltitol, about 9% sodium caseinate, and about 21% cocoa liquor. All composition percentages are presented as weight percentages.

Example 3

Maltitol syrup (3900 g) was charged in a Groen kettle and heated with agitation to 66° C. (150° F.). Dried sodium caseinate (390 g) was added and thoroughly dispersed into the syrup. Cocoa liquor (935 g) was added into the maltitol/caseinate mixture. After the cocoa liquor was melted and thoroughly mixed to form a homogeneous mass, the mass was heated to 105° C. (221° F.) and held at that temperature for 4 minutes. The material was transferred to a Keebler T238 jacketed twin screw vacuum mixer (available from the Keebler Engineering Co., Oak Lawn, Ill.) and mixed at a setting of 3 under a vacuum of 16 in. Hg for 30 minutes with house steam applied to the jacket to keep the mixture warm. After 30 minutes, the speed of the mixer was increased to setting 6 and the vacuum was increased to 22 in. Hg. After this treatment, the recovered resulting chocolate mass had a pleasant chocolate flavor. After drying, the final composition of the chocolate product was about 68% maltitol, about 9% sodium caseinate, and about 21% cocoa liquor. All composition percentages are presented as weight percentages.

Example 4

Maltitol syrup (4000 g) was charged into a Groen kettle and heated with agitation to 74° C. (165° F.). Dried sodium caseinate (400 g) was added and thoroughly dispersed into the syrup. Cocoa liquor (935 g) was added into the maltitol/caseinate mixture. After the cocoa liquor was melted and thoroughly mixed to form a homogeneous chocolate mass, the material was transferred to a Keebler T238 jacketed twin screw vacuum mixer, heated to 125° C. (257° F.) under a vacuum and held at that temperature for 4 minutes to remove water. The chocolate material was transferred to an oven and dried, without vacuum, at 96° C. (205° F.) for 1 hour to yield a chocolate mass with a pleasant chocolate flavor. After drying, the final composition of the chocolate product was about 68% maltitol, about 9% sodium caseinate, and about 21% cocoa liquor. All composition percentages are presented as weight percentages.

Although the foregoing description has necessarily presented a limited number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications will remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

What is claimed is:

1. A method of making a sugar-free chocolate crumb comprising:
   mixing a liquid, amorphous sugar-free sweetening composition with a dry milk substitute composition in a solid state and a chocolate formative composition to form a rudimentary chocolate mixture;
   heating the mixture to a temperature of at least 60° C.; and vacuum drying the mixture, such that all of the sugar-free sweetening composition mixed with the dry milk substitute composition remains amorphous in the sugar-free chocolate crumb.

2. The method of claim 1, wherein the liquid, amorphous sugar-free sweetening composition is selected from the group consisting of a polyol and an indigestible dextrin.

3. The method of claim 2, wherein the liquid, amorphous sugar-free sweetening composition is a polyol selected from the group consisting of maltitol syrup, sorbitol syrup, mannitol syrup, lactitol syrup, isomalt syrup, erythritol syrup, xylitol syrup, hydrogenated starch hydrolysates, and combinations thereof.

4. The method of claim 3, wherein the liquid, amorphous sugar-free sweetening composition is maltitol syrup.

5. The method of claim 1, wherein the dry milk substitute composition is selected from the group consisting of dried sodium caseinate, dried calcium caseinate and whey protein isolates.

6. The method of claim 1, wherein the chocolate formative composition is selected from the group consisting of cocoa liquor, chocolate liquor, cocoa powder, cocoa powder mixed with vegetable oil, and cocoa butter.

7. The method of claim 1, wherein the liquid, amorphous sugar-free sweetening composition comprises from 55% to 95% by weight of the confection, the dry milk substitute composition comprises from 5% to 15% by weight of the confection, and the chocolate formative composition comprises from 10% to 50% by weight of the confection.

8. The method of claim 1, further comprising refining the rudimentary chocolate mixture before heating the mixture.

9. The method of claim 8, further comprising conching the rudimentary chocolate mixture while heating the mixture.

10. The method of claim 9, further comprising adding flavor ingredients to the rudimentary chocolate mixture during the conching.

11. The method of claim 9, further comprising adding texturizing ingredients to the rudimentary chocolate mixture during the conching.

12. The method claim 1, further comprising adding additional flavor ingredients to the rudimentary chocolate mixture.

13. The method of claim 12, wherein the flavor ingredients are selected from the group consisting of vanilla, vanillin, coffee, hydrolyzed milkfat, and salt.

14. A chocolate crumb prepared from the process comprising:
mixing an amorphous, soluble fiber with a dry milk substitute composition and a chocolate formative composition to form a rudimentary chocolate mixture;
heating the rudimentary chocolate mixture to a temperature of at least 60° C.; and
vacuum drying the rudimentary chocolate mixture, thus producing the chocolate crumb having all of the soluble fiber being amorphous.

15. The chocolate crumb of claim 14, further comprising a polyol selected from the group consisting of maltitol syrup, sorbitol syrup, mannitol syrup, lactitol syrup, isomalt syrup, erythritol syrup, xylitol syrup, hydrogenated starch hydrolysates, and combinations of any thereof.

16. The chocolate crumb of claim 15, wherein the polyol is the maltitol syrup.

17. The chocolate crumb of claim 14, wherein the dry milk substitute composition is selected from the group consisting of dried sodium caseinate, dried calcium caseinate, whey protein isolates and combinations of any thereof.

18. The chocolate crumb of claim 14, wherein the chocolate formative composition is selected from the group consisting of cocoa liquor, chocolate liquor, cocoa powder, cocoa powder mixed with vegetable oil, cocoa butter and combinations of any thereof.

19. The chocolate crumb of claim 18, wherein the chocolate formative composition is cocoa liquor.

20. The chocolate crumb of claim 14, wherein the amorphous, soluble fiber comprises from 55% to 95% by weight of the crumb, the dry milk substitute composition comprises from 5% to 15% by weight of the crumb and the chocolate formative composition comprises from 10% to 50% by weight of the crumb.

21. The chocolate crumb of claim 20, wherein the amorphous, soluble fiber comprises from 65% to 85% by weight of the crumb, the dry milk substitute composition comprises from 7.5% to 12.5% by weight of the crumb and the chocolate formative composition comprises from 20% to 40% by weight of the crumb.

22. The chocolate crumb of claim 21, wherein the amorphous, soluble fiber comprises from 70% to 80% by weight of the crumb, the dry milk substitute composition comprises from 9% to 11% by weight of the crumb and the chocolate formative composition comprises from 25% to 35% by weight of the crumb.

23. The chocolate crumb of claim 14, wherein the mixture is heated to a temperature of 50° C. to 100° C.

24. A method of making a chocolate crumb confection comprising:
mixing an indigestible dextrin without a crystalline structure with a dry milk substitute composition and a chocolate formative composition to form a rudimentary chocolate mixture;
heating the rudimentary chocolate mixture to a temperature between 60° C.-125° C.; and
vacuum drying the rudimentary chocolate mixture, thus producing the chocolate crumb confection and wherein all of the indigestible dextrin in the chocolate crumb confection lacks the crystalline structure.

25. The method of claim 24, wherein the dry milk substitute composition is selected from the group consisting of dried sodium caseinate, dried calcium caseinate and whey protein isolates.

26. The method of claim 24, wherein the chocolate formative composition is selected from the group consisting of cocoa liquor, cocoa powder, cocoa powder mixed with vegetable oil, and cocoa butter.

27. The method of claim 24, wherein the indigestible dextrin comprises from 55% to 95% by weight of the confection, the dry milk substitute composition comprises from 5% to 15% by weight of the confection, and the chocolate formative composition comprises from 10% to 50% by weight of the confection.

28. The method of claim 24, further comprising refining the rudimentary chocolate mixture before heating the mixture.

29. The method of claim 28, further comprising conching the rudimentary chocolate mixture while heating the mixture.

30. The method of claim 24, further comprising adding at least one flavor ingredient to the rudimentary chocolate mixture.

31. The method of claim 30, wherein the at least one flavor ingredient is selected from the group consisting of vanilla, vanillin, coffee, hydrolyzed milkfat, and salt.

32. A chocolate composition comprising:
55% to 95% by weight of the chocolate composition of an indigestible dextrin;
an amorphous polyol lacking a crystalline structure;

5% to 15% by weight of the chocolate composition of a dry milk substitute; and

10% to 50% by weight of the chocolate composition of a chocolate formative composition;

wherein the indigestible dextrin, the amorphous polyol, the dry milk substitute, and the chocolate formative composition are mixed together, heated and vacuum dried such that the chocolate composition in the form of a crumb;

wherein all of the polyol in the chocolate composition lacks the crystalline structure.

33. The chocolate composition of claim 32, further comprising a compound selected from the group consisting of corn syrup, high fructose corn syrup, molasses, honey, polyols, indigestible dextrin, tagatose syrup, and combinations thereof.

34. The chocolate composition of claim 32, wherein the dry milk substitute is selected from the group consisting of dried sodium caseinate, dried calcium caseinate and whey protein isolates.

35. The chocolate composition of claim 32, wherein the chocolate formative composition is selected from the group consisting of cocoa liquor, chocolate liquor, cocoa powder, cocoa powder mixed with vegetable oil, and cocoa butter.

36. The chocolate composition of claim 32, wherein the indigestible dextrin comprises 65% to 85% by weight of the composition, the dry milk substitute comprises from 7.5% to 12.5% by weight of the composition, and the chocolate formative composition comprises from 20% to 40% by weight of the composition.

37. The chocolate composition of claim 36, wherein the indigestible dextrin comprises 70% to 80% by weight of the composition, the dry milk substitute comprises from 9% to 11% by weight of the composition, and the chocolate formative composition comprises from 25% to 35% by weight of the composition.

38. The chocolate composition of claim 32, wherein the crumb is an ingredient in a chocolate product selected from the group consisting of chocolate beverages, chocolate baking mixes, chocolate coating mixtures, frostings, ice cream, ice cream toppings, ice cream inclusions, frozen desserts, dessert toppings, dessert inclusions, yogurts, milk shakes, confections, cookies, cakes, breakfast cereals, cream fillings, icings spreads, syrups, breakfast bars, nutrition bars, and chocolate bars.

39. A method of making a crumb confection comprising:
   mixing a polyol syrup and at least one of an oil and a fat to form a rudimentary mixture;
   heating the rudimentary mixture to a temperature of at least 60° C.; and
   vacuum drying the rudimentary mixture;
   wherein all of the polyol syrup lacks a crystalline structure during the method.

* * * * *